United States Patent
Osborne et al.

(10) Patent No.: US 8,813,314 B2
(45) Date of Patent: Aug. 26, 2014

(54) PIN APPARATUSES AND METHODS

(75) Inventors: Christopher M. Osborne, Efland, NC (US); Vincent Prinzo, Hillsborough, NC (US)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 13/180,090

(22) Filed: Jul. 11, 2011

(65) Prior Publication Data

US 2012/0009043 A1    Jan. 12, 2012

Related U.S. Application Data

(60) Continuation of application No. 11/848,340, filed on Aug. 31, 2007, now Pat. No. 7,975,359, which is a division of application No. 11/228,594, filed on Sep. 16, 2005, now Pat. No. 7,412,753.

(51) Int. Cl.
    *B62D 51/00*    (2006.01)

(52) U.S. Cl.
    USPC .............................................. 16/437; 16/441

(58) Field of Classification Search
    USPC ......... 16/113.1, 437; 411/340–345, 351, 354, 411/384; 403/108, 154, 155, 322, 901.4, 403/901.1; 280/47.371; 248/292.12
    See application file for complete search history.

(56) References Cited

U.S. PATENT DOCUMENTS

| 636,582 A | 11/1899 | Streng |
| 1,087,928 A | 2/1914 | Diemer |
| 1,805,136 A | 5/1931 | Eberle |
| 1,896,442 A | 2/1933 | Farmer |
| 2,264,121 A | 11/1941 | Pattiani |

(Continued)

FOREIGN PATENT DOCUMENTS

| CN | ZL 200610154255.9 | 8/2012 |
| DE | 3910867 | 9/1990 |

(Continued)

OTHER PUBLICATIONS

Partial European Search Report for European Patent Application No. 06019284.6 dated Dec. 15, 2006.

(Continued)

*Primary Examiner* — Chuck Mah
(74) *Attorney, Agent, or Firm* — Jenkins, Wilson, Taylor & Hunt, P.A.

(57) ABSTRACT

Pin apparatuses and methods are disclosed having particular suitability for use with machine handles such as those associated with walk-behind machines such as lawnmowers. A pin apparatus may include a housing defining an opening for receiving at least a portion of a pin. The pin may include an elongated pin body having a proximal end section and a distal end section. The pin apparatus may further include a pin handle external from the housing for moving the pin within the housing. At least a portion of the pin body can be positioned at least partially through a machine handle and at least a portion of the housing can be positioned outside of the machine handle. Rotation of the pin handle can move the pin between the extended position and the retracted position.

20 Claims, 12 Drawing Sheets

(56) References Cited

U.S. PATENT DOCUMENTS

| | | | |
|---|---|---|---|
| 2,600,611 | A | 2/1950 | Bevington |
| 3,132,835 | A | 5/1964 | Fritz |
| 3,190,677 | A | 6/1965 | Robbins |
| 3,423,103 | A | 1/1969 | Maltarp et al. |
| 3,534,432 | A | 10/1970 | Davies et al. |
| 3,649,997 | A | 3/1972 | Thorud |
| 3,694,855 | A | 10/1972 | Meyer et al. |
| 3,702,016 | A | 11/1972 | Keesee |
| 3,816,873 | A | 6/1974 | Thorud et al. |
| 3,950,817 | A | 4/1976 | McKaig |
| 4,030,854 | A | 6/1977 | Grannis |
| 4,243,342 | A | 1/1981 | Marto |
| 4,591,176 | A | 5/1986 | Kassai |
| 4,645,224 | A | 2/1987 | Poganski |
| 4,805,480 | A | 2/1989 | Tsubouchi et al. |
| 4,926,762 | A | 5/1990 | Paul |
| 5,062,179 | A | 11/1991 | Huang |
| 5,209,051 | A | 5/1993 | Langdon |
| 5,261,215 | A | 11/1993 | Hartz et al. |
| 5,586,852 | A | 12/1996 | Ganter |
| 5,642,896 | A | 7/1997 | Pierce et al. |
| 5,842,329 | A | 12/1998 | Carter |
| 6,203,051 | B1 | 3/2001 | Sabol |
| 6,257,647 | B1 | 7/2001 | Ninness et al. |
| 6,546,596 | B2 | 4/2003 | Grote et al. |
| 6,575,656 | B2 | 6/2003 | Suh |
| 6,585,206 | B2 | 7/2003 | Metz et al. |
| 6,662,879 | B1 | 12/2003 | Costa |
| 6,860,334 | B2 | 3/2005 | Yamazaki et al. |
| 6,981,304 | B2 | 1/2006 | Potter |
| 7,004,670 | B2 | 2/2006 | Chen et al. |
| 7,036,797 | B2 | 5/2006 | Liu |
| 7,168,727 | B2 | 1/2007 | Dick |
| 7,198,306 | B2 | 4/2007 | Ambs |
| 7,293,924 | B2 | 11/2007 | DeSorbo et al. |
| 7,335,139 | B2 | 2/2008 | Bartholomew |
| 7,398,987 | B2 | 7/2008 | Roe et al. |
| 7,412,753 | B2 | 8/2008 | Osborne |
| 7,975,359 | B2 | 7/2011 | Osborne |
| 2002/0179134 | A1 | 12/2002 | Suh |
| 2003/0092542 | A1 | 5/2003 | Bartholomew et al. |
| 2004/0160037 | A1 | 8/2004 | Dick |
| 2004/0181910 | A1 | 9/2004 | Kuo |
| 2005/0045169 | A1 | 3/2005 | Baris et al. |
| 2007/0108729 | A1 | 5/2007 | Dick |
| 2012/0009043 | A1 | 1/2012 | Osborne |

FOREIGN PATENT DOCUMENTS

| | | |
|---|---|---|
| EP | 0663495 A1 | 7/1995 |
| EP | 0 715 046 A1 | 6/1998 |
| EP | 1763986 | 3/2007 |
| EP | 1 997 365 B1 | 11/2010 |
| EP | 2 298 060 | 7/2013 |
| FR | 2 765 545 | 1/1999 |
| GB | 232739 | 4/1925 |
| GB | 533 486 | 2/1941 |
| GB | 1086304 | 10/1967 |
| WO | WO 99/62753 | 12/1999 |

OTHER PUBLICATIONS

Extended European Search Report for European Patent Application No. 06019284.6 dated Mar. 6, 2007.
Office Action—Restriction Requirement dated Jul. 24, 2007 for U.S. Appl. No. 11/228,594.
Non-final Office Action for U.S. Appl. No. 11/228,594 dated Dec. 5, 2007.
European Patent Office—Office Action dated Oct. 19, 2007 for European Patent Application No. 06019284.6.
Final Office Action for U.S. Appl. No. 11/228,594 dated Mar. 18, 2008.
Notice Of Allowance for U.S. Appl. No. 11/228,594 dated Jul. 2, 2008.
Communication under Rule 71(3) EPC from the European Patent Office dated Sep. 23, 2008 for Application No. 06 019 284.6.
Extended European Search Report for European Patent Application No. 08015045.1 dated Oct. 8, 2008.
Certificate of Grant for European Patent No. 1 763 986 dated Mar. 18, 2009.
Extended European search report for European Patent Application 08 015 045.1 dated Apr. 27, 2009.
Non-final Office Action for U.S. Appl. No. 11/848,340 dated Sep. 18, 2009.
Communication of a notice of opposition from European Patent Office for EP 1 763 986 (06 019 284.6) date Jan. 7, 2010.
Final Office Action for U.S. Appl. No. 11/848,340 dated Mar. 15, 2010.
Notice of Allowance for U.S. Appl. No. 11/848,340 dated Jun. 30, 2010.
EP Communication regarding Intent to Grant for EP 08015045.1-2313 dated May 20, 2010.
English Translation of Chinese Office Action for CN 2006/10154255 dated Jul. 9, 2010.
Non-final Office Action for U.S. Appl. No. 11/848,340 dated Nov. 12, 2010.
European Search Report for 10182830.9-2313 dated Feb. 12, 2010.
Notice of Allowance for U.S. Appl. No. 11/848,340 dated May 11, 2011.
Communication regarding the expiry of the time limit within which notice of opposition may be filed for Application Serial No. EP 1997365dated Sep. 21, 2011.
Chinese Office Action for Application Serial No. 200610154255 dated Jan. 6, 2012.
European Office Action for Application Serial No. EPO 10 182 830.9 dated Mar. 20, 2012.
Notification of Grant Patent Right for Chinese Application No. CN 200610154255 dated Apr. 16, 2012.
Chinese Notice of Allowance for Application Serial No. CN 200610154255.9 dated Apr. 16, 2012.
European Office Action for Application No. 10 182 830.9 dated Nov. 26, 2012.
European Intent to Grant for Application No. 10 182 830.9-1656 dated Feb. 19, 2013.
European Decision to Grant for Application No. 10 182 830.9-1656 dated Jul. 4, 2013.

PIN APPARATUSES AND METHODS

RELATED APPLICATIONS

This application is a continuation of and claims priority to U.S. patent application Ser. No. 11/848,340 filed Aug. 31, 2007, now U.S. Pat. No. 7,975,359, which is a divisional of and claims priority to U.S. patent application Ser. No. 11/228,594 filed Sep. 16, 2005, now U.S. Pat. No. 7,412,753, the disclosures of which are incorporated herein by reference in their entirety.

TECHNICAL FIELD

The subject matter disclosed herein relates generally to pin apparatuses and methods. More particularly, the subject matter disclosed herein relates to pin apparatuses and methods having particular suitability for use with a machine handle, such as a machine handle of a walk-behind machine such as a lawnmower.

BACKGROUND ART

Conventional technology used to adjust a handle of a walk-behind machine such as a lawnmower to adjust into different positions utilizes bolts, and sometimes knobs, typically tightened by hand. In light of the trend for walk-behind machines such as lawnmowers to be assembled and set up by customers rather than by dealers, it is desirable for the machines to be designed to provide for easy setup out of the box with virtually no required assembly. Since walk-behind machines such as lawnmowers are now many times being sold to customers that take them home in the box as shipped, an even greater need for easy handle setup and adjustability built into the same mechanism is desirable.

A variety of apparatuses and methods exist in the prior art for use with handles or handle components. U.S. Pat. No. 6,546,596 to Grote et al. disclose an extension pole for tools and teaches a locking pin housing which is tubular and which extends from a sleeve 36. A locking pin 42 and a retainer spring 44 are contained within the locking pin housing 40. Holes are defined in the floor of an extension tube keyway 20, and the distal end 50 of the locking pin 42 is adapted for selectively engaging any of the holes. In this manner, the locking pin 42 can be biased or urged by spring 44 to extend into a latched position with at least a portion of the distal end engaging one of the holes.

U.S. Pat. No. 3,702,016 to Keesee discloses a handle unit for a lawnmower comprising locking pins 41 which are adapted to enter openings 39 and the aligned opening 38 to lock an upper handle member 34 in selected vertical positions relative to a lower handle member 22. A compression spring 44 surrounds each locking pin 41 between a lateral flange 42 and a spring abutment 46 in order for the locking pin 41 to be urged inwardly toward the opening 38.

U.S. Pat. No. 3,816,873 to Thorud et al. discloses a folding handle and latch assembly latch pins 25 which protrude through lower legs 15 and through aligned holes 26 in the upper lapping portion of upper legs 22 in order to maintain alignment of upper legs 22 with lower legs 15. A spring-wire handle 27 is disclosed and passes through the inner end of the each of latch pins 25. Each spring-wire handle 27 includes a transverse bend at a lower end which passes outwardly through the lower legs and is secured by retaining clips 28.

U.S. Pat. No. 4,243,342 to Marto discloses a fastener assembly for connecting an attachment to a frame. The fastener includes a pin holder, a latched pin and a torsion spring.

U.S. Pat. No. 3,694,855 to Meyer et al. discloses an adjustable handle for lawnmowers. A locking cam 20 along with other, related structure is utilized with an elongated tie rod 15 passing though holes in handle components 9 and 10 such that locking can 20 can be used to quickly lock and unlock the folded and unfolded positions of handle components 9 and 10.

U.S. Pat. No. 3,649,997 to Thorud discloses a folding handle latch utilizing an elongate latch pin 27 adapted for moving between openings defined through two spaced-apart, tubular handle components. A latch handle 28 can be formed of an integral length spring wire or rod and can attach at one end to one of the tubular components and at the other end to an end of latch pin 27.

Despite the existence of the prior art such as that described above, much room for improvement exists for pin apparatuses and methods such as that having particular use with machine handles associated with walk-behind machines such as lawnmowers.

SUMMARY

In accordance with the subject matter disclosed herein, novel pin apparatuses and methods are disclosed. While the pin apparatuses and methods can be adapted for any suitable use, the pin apparatuses and methods have particular use with machine handles such as those associated with walk-behind machines such as lawnmowers. A pin apparatus according to the disclosure herein can comprise a housing defining an opening for receiving at least a portion of a pin. A pin can be provided having an elongated pin body with a proximal end section and a distal end section. The pin body can be adapted for positioning at least partially through the opening of the housing where the pin is movable with respect to the housing according to a method disclosed herein from an extended position where at least a portion of the distal end section extends to a predetermined extent outside of the opening, and a retracted position where the distal end section is in a retracted position from the predetermined extent. A handle can be provided external from the housing for moving the pin whereby movement of the handle moves the pin between the extended position and the retracted position.

It is therefore an object of the present disclosure to provide novel pin apparatuses and methods having particular suitability for use with a machine handle of a walk-behind machine, such as, for example, a lawnmower.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

DETAILED DESCRIPTION

Figure 1:
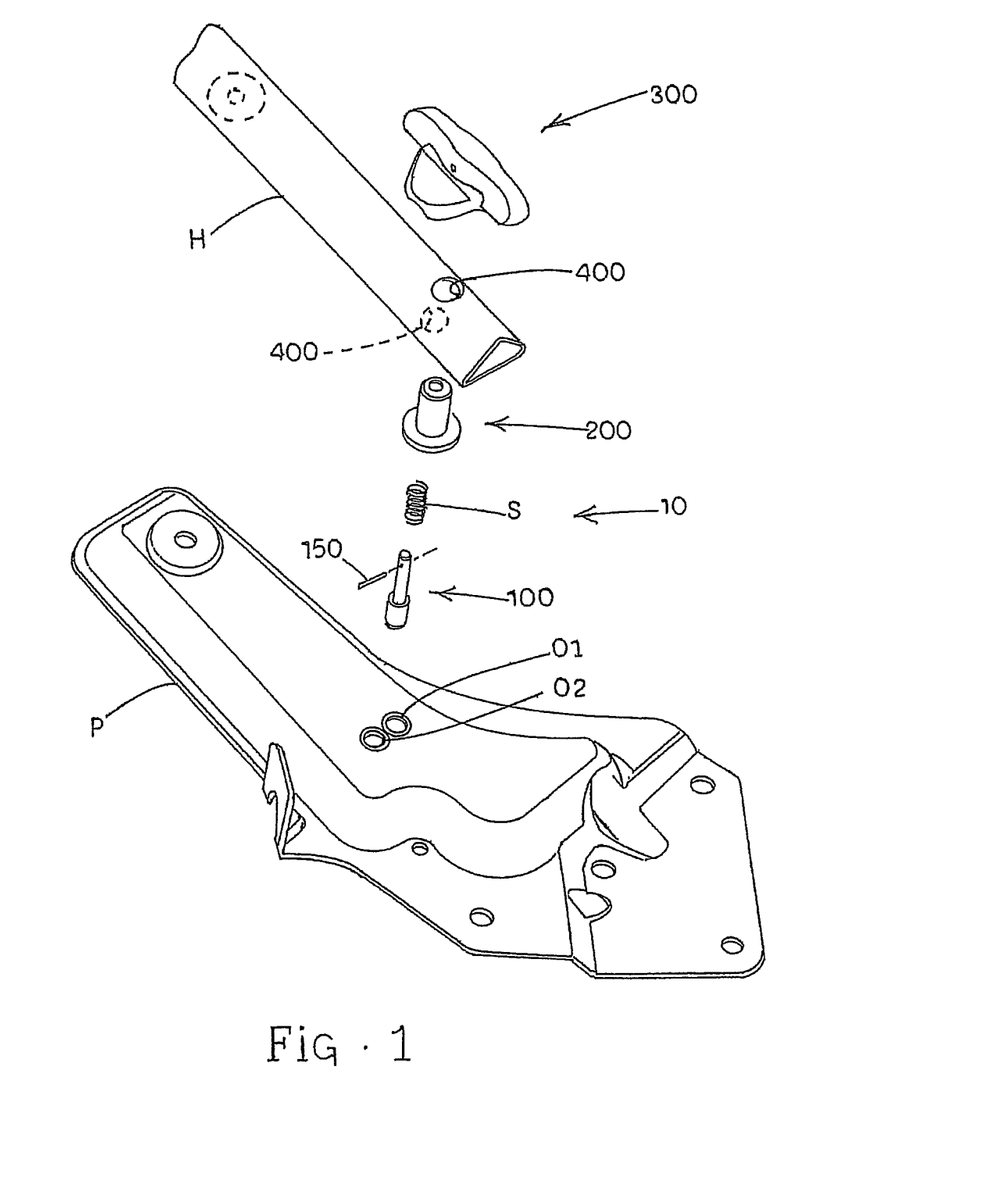
FIG. 1 of the drawings is an exploded view of a pin apparatus with a machine handle and a positioning plate according to the present disclosure.

In accordance with the subject matter disclosed herein, and with particular reference to the exploded view provided by FIG. 1 of the drawings, a pin apparatus generally designated 10 is provided and comprises a pin with a pin body generally designated 100, a housing generally designated 200, and a handle generally designated 300. Pin body 100, housing 200 and handle 300 are illustrated and discussed in greater detail herein below. While it is envisioned that pin apparatus 10 can be adapted for any suitable use, pin apparatus 10 in FIG. 1 is illustrated in an exploded view for assembly with a machine handle that can be associated with a walk-behind machine.

When assembled, pin apparatus 10 can extend at least partially through machine handle H and be used to maintain machine handle H in a desired alignment with respect to a positioning plate P. A retaining pin 150 can be used with pin body 100 to securely maintain the position of pin body 100 with respect to handle 300 when pin apparatus 10 is fully assembled as described in detail below. A biasing member, such as spring S, can be positioned around a portion of pin body 100 as further shown and described below. Positioning plate P can be attached to a walk-behind machine, such as a lawnmower, as further illustrated and described below. Machine handle H can be an elongated, pipe-type handle of any suitable cross-sectional configuration. As illustrated in FIG. 1, a portion of machine handle H is illustrated as machine handle H is shown with a triangular cross section and wherein machine handle H defines an opening 400 that can be defined transversely through machine handle H and can be adapted for receiving at least a portion of housing 200. When housing 200 is positioned through opening 400 of machine handle H, at least a portion of pin body 100 can extend through housing 200 such that handle 300 can attach to a portion of pin body 100. As described in greater in detail below, handle 300 can be utilized to cause movement of pin body 100 within housing 200 such that pin body 100 can be in an extended position where a portion of pin body 100 extends at least partially into an opening defined in positioning plate P. As shown in FIG. 1, positioning plate P can define at least one or more positioning holes or openings, such as openings 01 and 02. It is envisioned that positioning plate P can define any number of suitable openings adapted for receiving at least a portion of pin body 100 in accordance with the present disclosure. Positioning plate P can be of any suitable shape or configuration adapted for attachment to a machine such as a walk-behind machine.

Figure 2A:
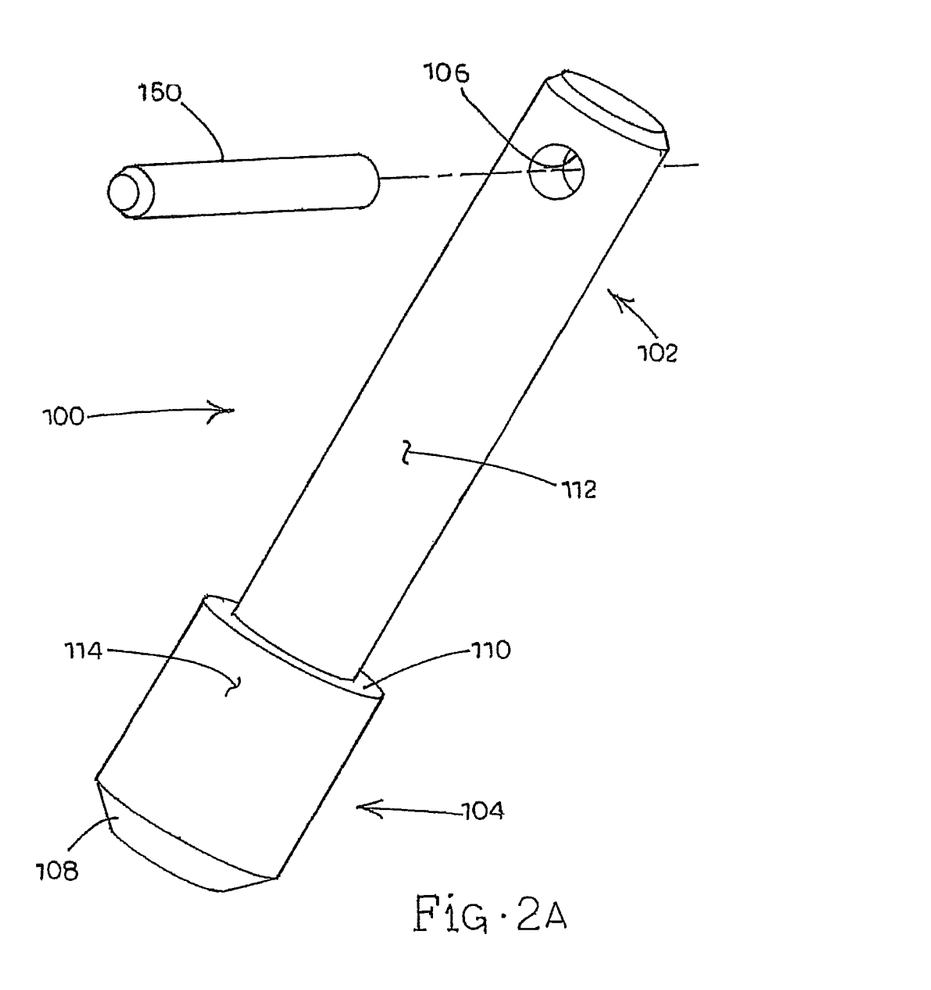
FIG. 2*a* of the drawings is an isolated, perspective view of the pin body from the pin apparatus of FIG. 1, and FIGS. 2*b* and 2*c* are top and bottom end views, respectively, of the pin body.
Figure 2B:
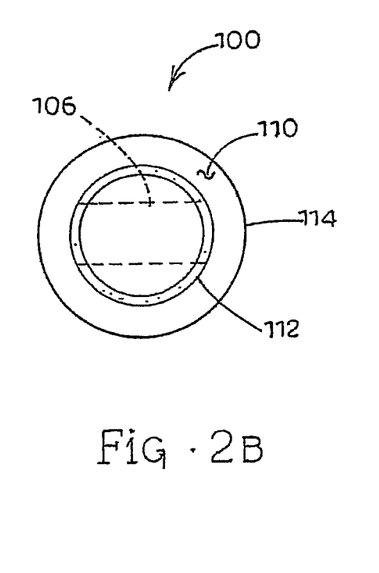
Figure 2C:
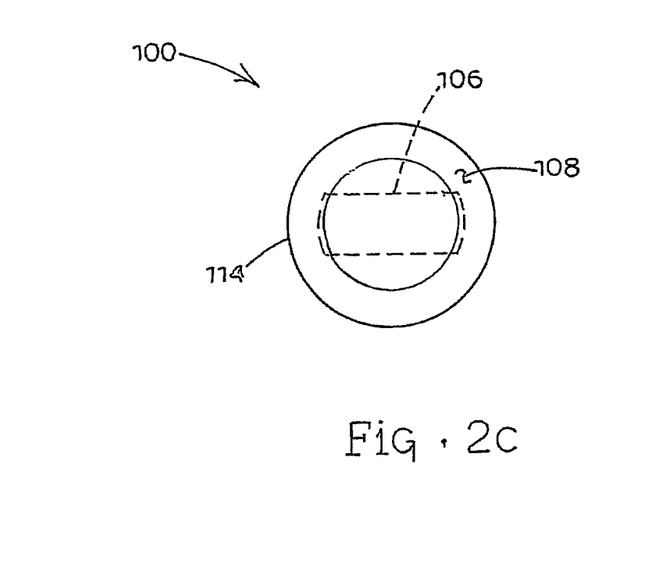

Referring specifically to FIGS. 2a, 2b and 2c of the drawings, pin body 100 is illustrated in greater detail and comprises a proximal end section generally designated 102 and a distal end section generally designated 104. Proximal end section 102 of pin body 100 can comprise an elongated, cylindrical outer configuration and define a transverse opening 106 therethrough for receiving retaining pin 150. Handle 300 (shown in FIG. 1) can be positioned on proximal end section 102 of pin body 100 prior to placement of retaining pin 150. After proper placement of handle 300 on proximal end section 102, placement of retaining pin 150 through transverse opening 106 securely maintains handle 300 on proximal end section 102 of pin body 100. Distal end section 104 of pin body 100 can comprise an outer wall section with a cylindrical shape of a greater diameter than the diameter of the outer wall section of proximal end section 102. At one end of distal end section 104, a tapered shelf 108 can be formed by distal end section 104 and extend peripherally around pin body 100. At an opposite end of distal end section 104, a flat shelf 110 can be formed by distal end section 104 and extend peripherally around pin body 100. Flat shelf 100 can be adapted for engaging spring S as further described below.

Pin body 100 as shown can therefore extend and be disposed along a central, longitudinal axis as both proximal end section 102 and distal end section 104 can be disposed along the same central axis. As illustrated, a majority of the length of pin body 100 comprises a cylindrical or tubular portion with an outer wall 112 of which at least a portion of which constitutes proximal end section 102. Also as shown, distal end section 104 can comprise a cylindrical or tubular portion with an outer wall 114 of a diameter substantially greater than the diameter of outer wall 112. It is envisioned according to the present disclosure that any suitable diameters of outer walls 112 and 114 can be utilized for pin body 100.

Figure 3A:
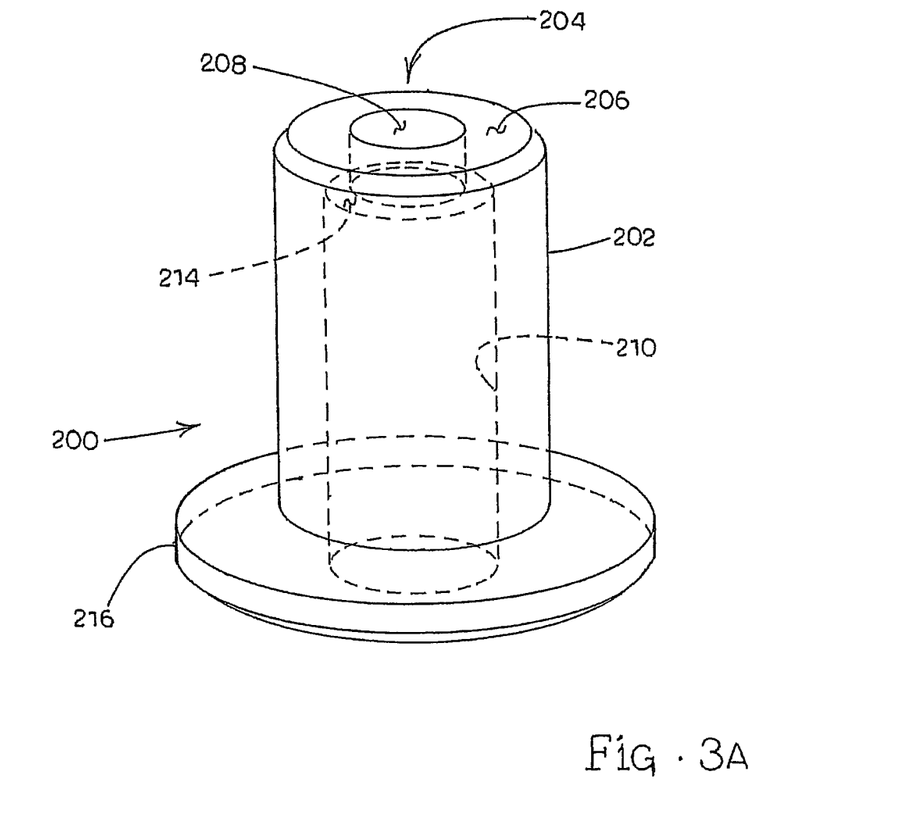
FIG. 3*a* of the drawings is an isolated, perspective view of the housing of the pin apparatus of FIG. 1, and FIGS. 3*b* and 3*c* are top and bottom end views, respectively, of the housing.
Figure 3B:
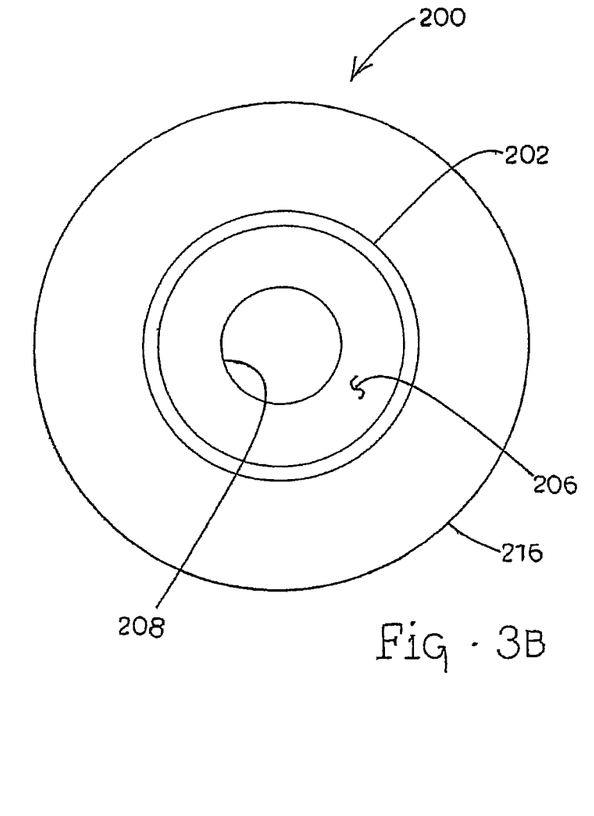
Figure 3C:
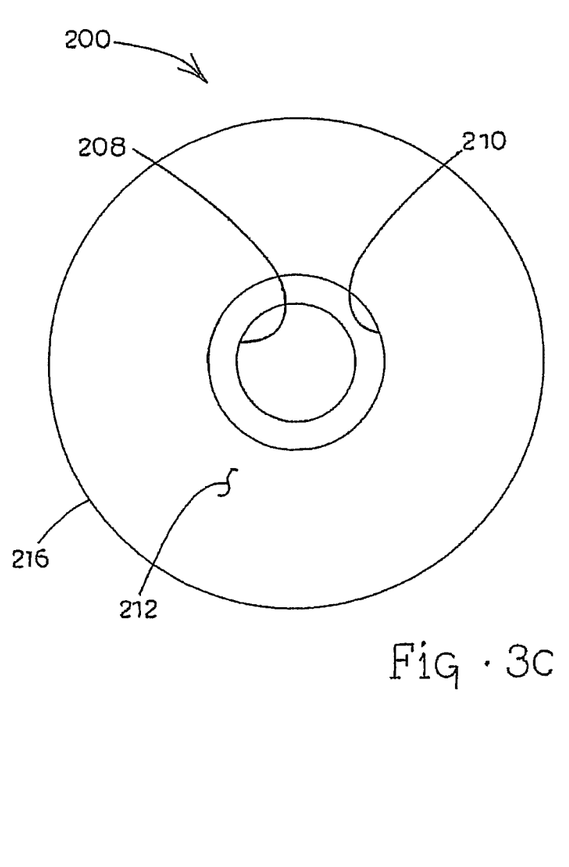

Referring now to FIGS. 3a, 3b, and 3c of the drawings, housing 200 is illustrated and comprises an elongated housing body 202 that defines an opening generally designated 204 that can be disposed along a central, longitudinal axis of an elongated housing body 202. Opening 204 can be in a top end 206 of elongated housing body 202, and opening 204 can be suitably shaped and adapted for receiving proximal end section 102 of pin body 100 as shown and described further below. In top end 206 of elongated housing body 202, opening 204 can have an inner wall 208 that can be cylindrical in shape and form an opening diameter suitable for receiving proximal end section 102 of pin body 100 as described further below. Further inside and toward an opposite end of elongated housing body 202, opening 204 can have an expanded, inner wall 210 that can be cylindrical in shape and have an opening diameter greater than the opening diameter formed by inner wall 208. Expanded inner wall 210 can extend entirely through elongated housing body 202 along a central axis thereof and be open at a bottom end 212 of elongated housing body 202. The opening diameter formed by inner wall 210 can be suitably shaped and adapted for receiving distal end section 104 of pin body 100. At the intersection of inner wall 208 and inner wall 210 of opening 204, elongated housing body 202 can form a shelf 214 which can be suitably shaped and adapted for engaging an end of spring S as further illustrated and described below. A collar 216 can be attached to or formed as a part of bottom end 212 of elongated housing body 202.

While it is envisioned in accordance with the present disclosure that the outer shape of elongated housing body 202 can be any shape suitable for use as described herein, elongated housing body 202 is illustrated for example only and without limitation as having an outer cylindrical shape that can be of a size and shape adapted for positioning through opening 400 of machine handle H as shown and described further below.

Figure 4:
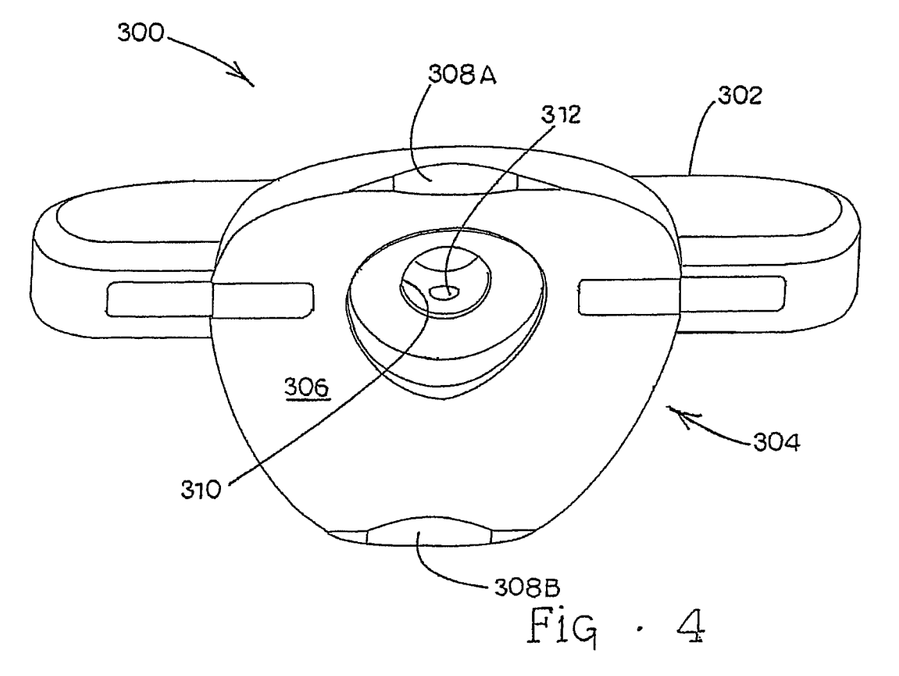
FIG. 4 of the drawings is an isolated, perspective view of the bottom of the handle of the pin apparatus of FIG. 1.

Referring now to FIG. 4 of the drawings, a bottom, perspective view of handle 300 is provided. As shown, handle 300 includes an upper grip portion 302 and a lower, cover portion generally designated 304. Grip portion 302 can be of any suitable shape and configuration adapted for a user to grip and rotate, turn or twist handle 300. Cover portion 304 can be formed as a part of handle 300 as a lower extension from grip portion 302 or cover portion 304 could be suitably attached to grip portion 302. Cover portion 304 can be shaped and adapted for fitting onto a portion of machine handle H (shown in FIG. 1). As shown in FIG. 4, cover portion 304 can be at least generally concave or V-shaped in cross-sectional shape and include a lower surface 306 that can have a shape and configuration at least substantially identical to the shape, configuration and profile of an upper surface of machine handle H as shown and described further below. On opposite ends of cover portion 304, edges 308a and 308b can be formed by cover portion 304 and can be curved in a profile adapted to fit on an upper edge of machine handle H as shown and described further below. In order to allow handle 300 to fit and attach to proximal end section 102 of pin body 100 (shown previously), a central opening 310 can be defined from the bottom of handle 300 through cover portion 304 and extend into the inside of grip portion 302 where proximal end section 102 of pin body 100 can be positioned. As described with reference to FIG. 1, a retaining pin 150 (shown in FIG. 1) can be used and positioned through an opening 312 defined through grip portion 302 of handle 300.

Figure 5A:
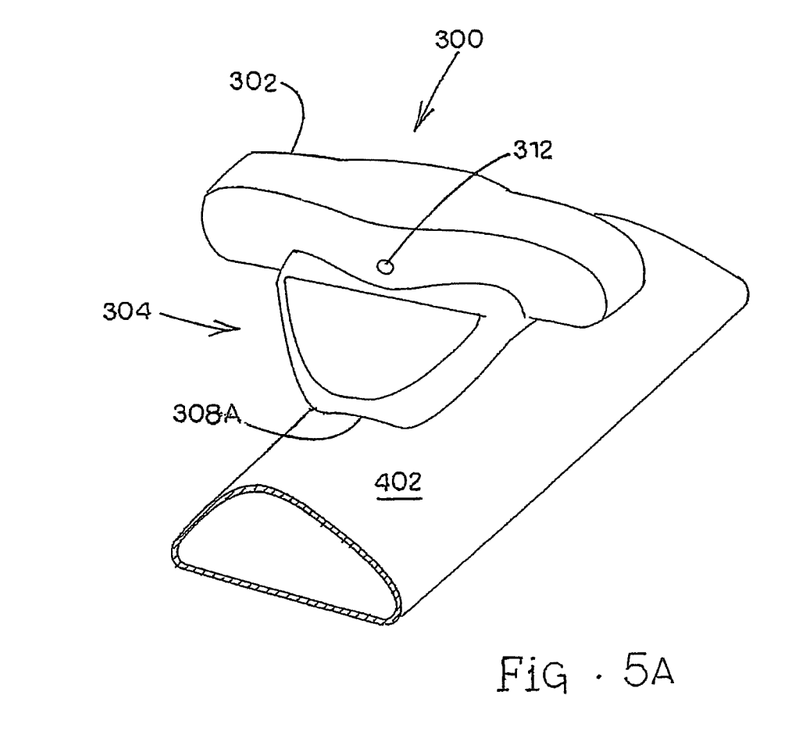
FIG. 5a of the drawings is a perspective view illustrating the position of the handle of the pin apparatus of FIG. 1 when the pin is in a retracted position.
Figure 5B:
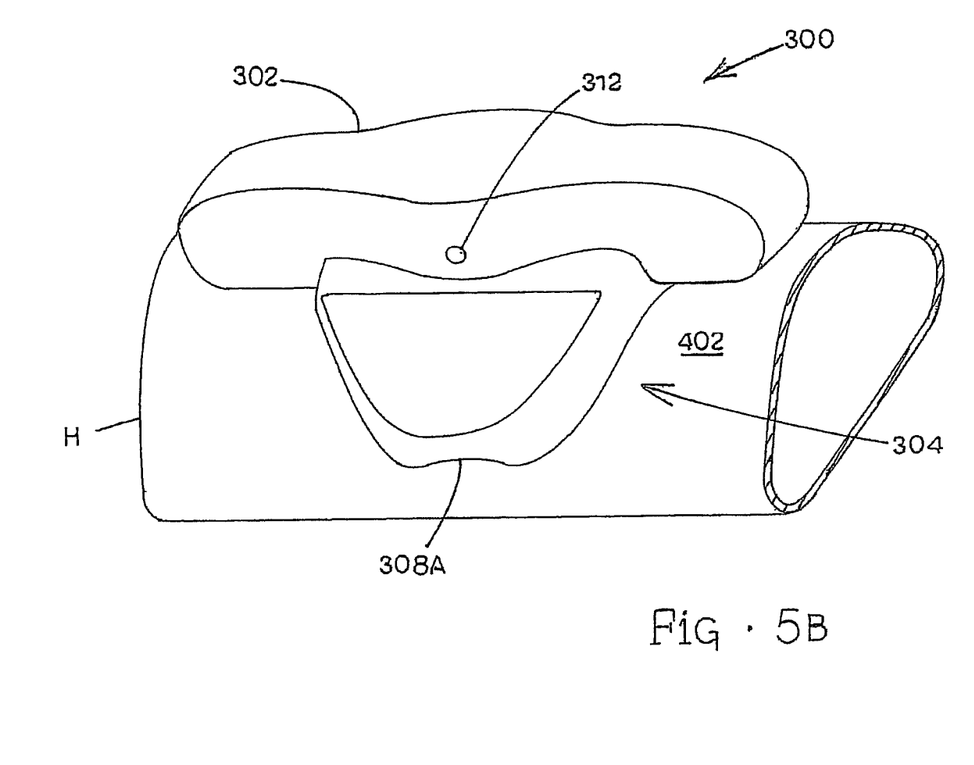
FIG. 5b of the drawings is a perspective view illustrating the position of the handle of the pin apparatus of FIG. 1 when the pin is in an extended position.

FIGS. 5a and 5b of the drawings illustrate the positions of handle 300 with respect to machine handle H when pin body 100 (shown previously) is in a retracted position versus an extended position. When pin body 100 is a retracted position, handle 300 is positioned as illustrated in FIG. 5a where grip portion 302 extends in a direction at least generally perpendicular to the direction of extension of machine handle H. In this position, cover portion 304 of handle 300 is aligned and positioned such that edge 308a and edge 308b (shown in FIG. 4) of cover portion of 304 engage and rest upon an upper surface 402 of machine handle H. In this position, a space or gap can exist between upper surface 402 of machine handle H and at least a portion of cover portion 304 of handle 300.

When pin body 100 (shown previously) is in an extended position, handle 300 can be positioned as illustrated in FIG. 5b where grip portion 302 extends in a direction at least generally parallel to the direction of extension of machine handle H. In this position, cover portion 304 of handle 300 can fit flush and entirely against upper surface 402 of machine handle H. Edge 308a and edge 308b (shown in FIG. 4) are positioned further down the sides and toward the bottom of upper surface 402 of machine handle H from their positions in FIG. 5a. Additionally, no gap exists between upper surface 402 and cover portion 304 of handle 300.

Figure 6A:
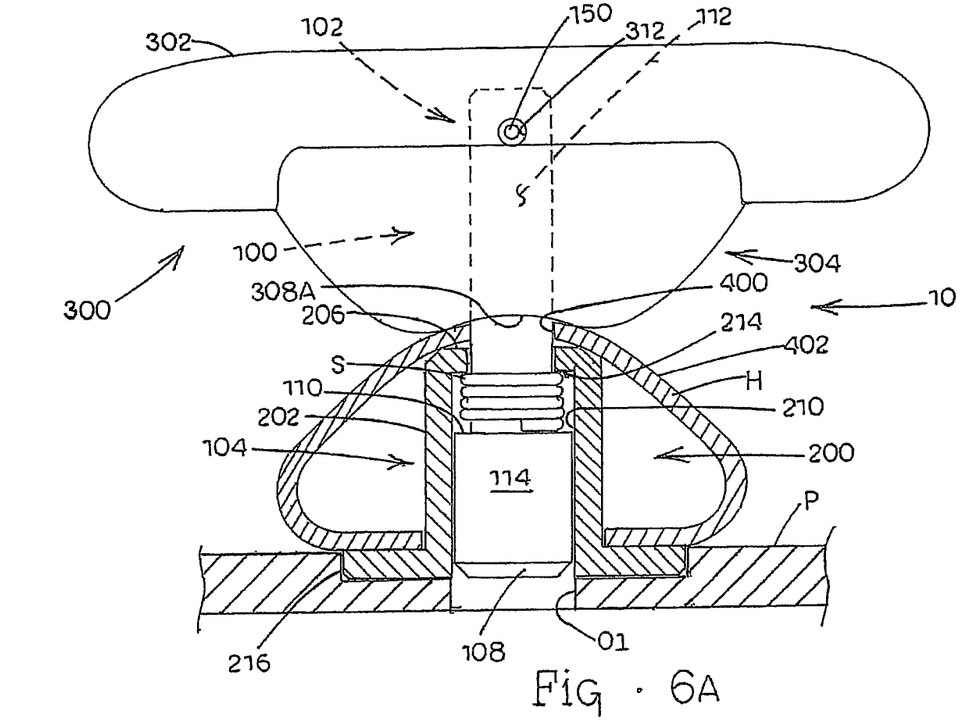
FIG. 6a of the drawings is a side view in partial section of the pin apparatus with the pin in a retracted position.

Referring now to FIG. 6a of the drawings, pin apparatus 10 is illustrated in a fully assembled form and where pin body 100 is in a retracted position such that no portion of pin body 100 extends into or through opening 01 of positioning plate P. Movement of machine handle H is therefore permitted since no portion of pin body 100 extends into or through opening 01 of positioning plate P. To achieve this position, handle 300 is positioned as illustrated and described as in FIG. 5a where grip 302 extends in a direction at generally perpendicular to the direction of extension of machine handle H and where cover portion 304 of handle 300 only contacts upper surface 402 of machine handle H by edges 308a and 308b (shown in FIG. 5a) of cover portion 304 engaging and resting upon the upper portion of upper surface 402 of machine handle H. In this position, proximal end section 102 of pin body 100 is maintained a distance away from machine handle H by retaining pin 150 securing and maintaining pin body 100 in its attachment with handle 300. Spring S can be compressed in this position as spring S can be positioned peripherally around outer wall 112 of pin body 100 and extend between flat shelf 110 of distal end section 104 and shelf 214 of housing 200. Collar 216 is positioned outside of the bottom of machine handle H and can limit and prevent upper movement of housing 200 while top end 206 of housing 200. Top end 206 of housing 200 is illustrated as contained within machine handle H and can be of a size larger than the size of opening 400 in machine handle H in order to prevent movement of housing 200 through opening 400 in upper surface 402 of machine handle H. It is also envisioned according to the present disclosure that opening 400 in upper surface 402 of machine handle H could be larger than top end 206 and the overall outer diameter of elongated housing body 202 of housing 200. In such a configuration, collar 216 can by itself retain housing 200 in a fixed position with respect to limited or prevented upward movement of housing 200 within machine handle H.

Outer wall 114 of distal end section 104 is positioned and adapted for vertical, sliding movement within the area within an elongated housing body 202 defined by expanded inner wall 210. As shown in FIG. 6a, tapered shelf 108 of distal end section 104 of pin body 100 is maintained at a predetermined position and does not extend into or through opening 01 of positioning plate P.

Figure 6B:
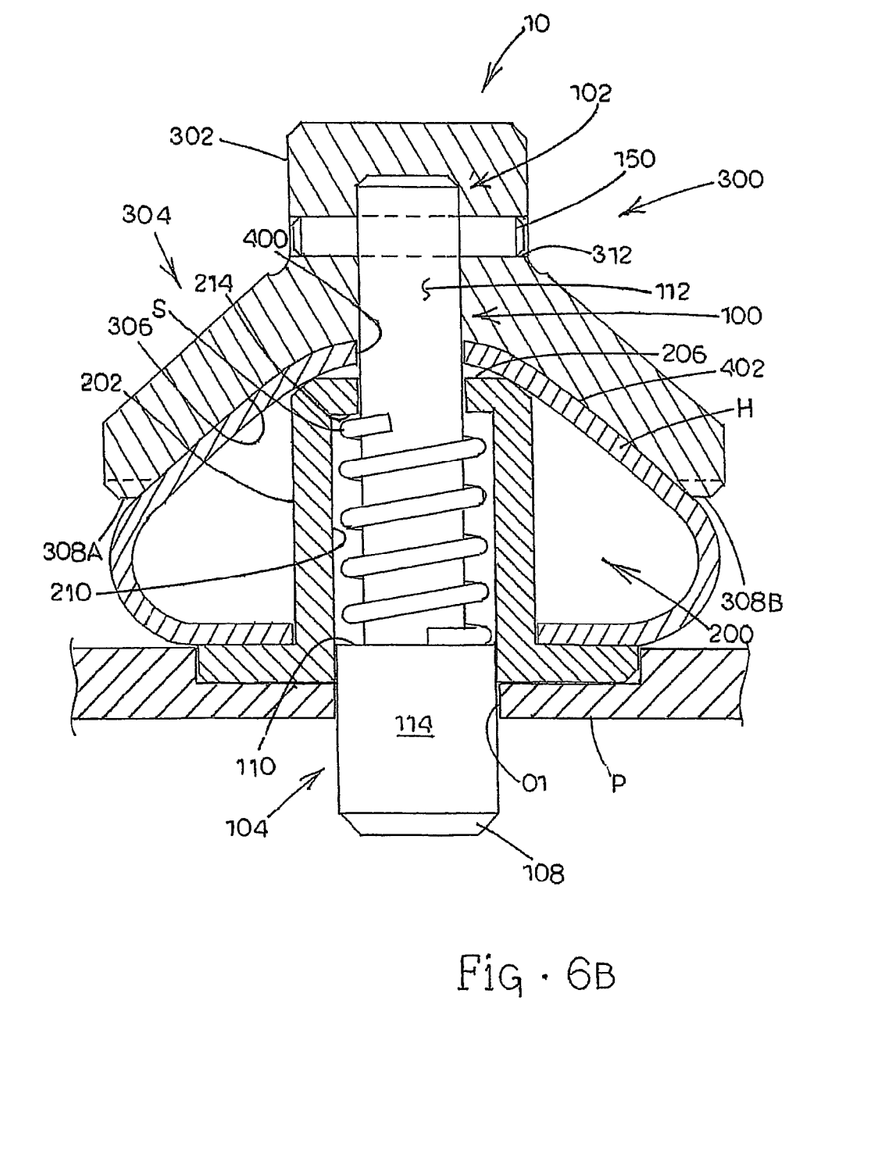
FIG. 6b of the drawings is a side sectional view of the pin apparatus with the pin in an extended position.

Referring now to FIG. 6b of the drawings, pin apparatus 10 is shown in a fully assembled form and with pin body 100 in its extended position where at least a portion of pin body 100 extends into opening 01 of positioning plate P. In order to achieve this extended position from the retracted position shown in FIG. 6a, handle 300 can simply be twisted to the position shown in FIG. 6b where cover portion 304 of handle 300 fits against upper surface 402 of machine handle H. Lower surface 306 of cover portion 304 of handle 300 can fit directly on and against upper surface 402 of machine handle H as shown with no gap between any portion of cover portion 304 and machine handle H. Twisting or turning handle 300 from the position shown in FIG. 6a to the position shown in FIG. 6b moves pin body 100 downwardly within housing 200 such that proximal end section 102 of pin body 100 is closer to machine handle H than it was in the retracted position shown in FIG. 6a. Such movement of handle 300 therefore forces pin body 100 downwardly through housing 200. Bias provided by spring S within housing 200 facilitates movement of pin body 100 into its extended position as spring S urges distal end section 104 of pin body 100 downwardly. As shown in FIG. 6b, distal end section 104 of pin body 100 has now progressed from the retracted position shown in FIG. 6a to the extended position shown in FIG. 6b where at least a portion of distal end section 104 extends into and/or through opening 01 of positioning plate P. As shown for example in FIG. 6b, a portion of outer wall 114 of distal end section 104 has extended through and below opening 01 of positioning plate P. In this position, pin apparatus 10 therefore securely maintains machine handle H in a desired position with respect to positioning plate P.

While FIGS. 6a and 6b show pin body 100 first in a retracted position and then in an extended position, it can be appreciated that moving pin body 100 from its extended position shown in FIG. 6b back to its retracted position shown in FIG. 6a can easily be accomplished by simply twisting handle 300 to rotate and move handle 300 back to its position shown in FIG. 6a.

Figure 7A:
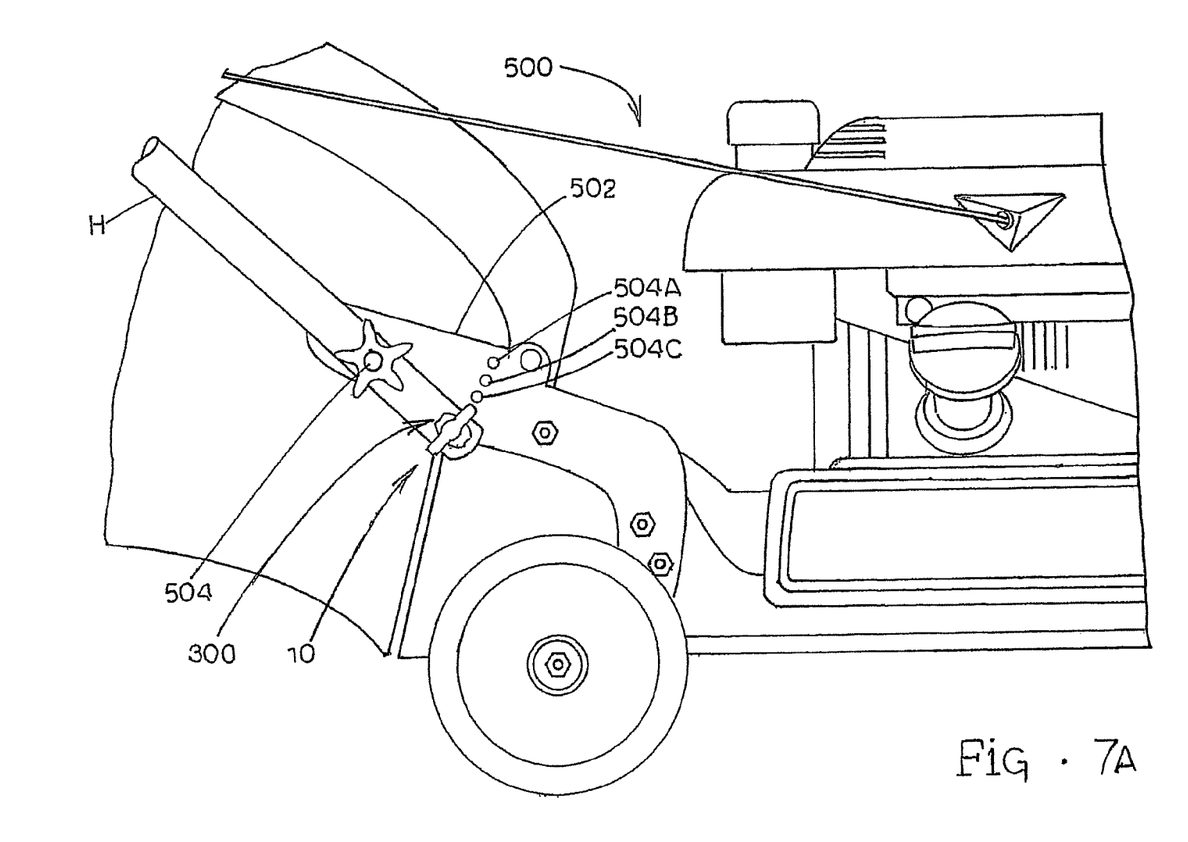
FIGS. 7a and 7b of the drawings are side elevation views illustrating possible positions of the handle of the pin apparatus on a machine handle of a lawnmower when the pin is in a retracted position and when the pin is in an extended position.
Figure 7B:
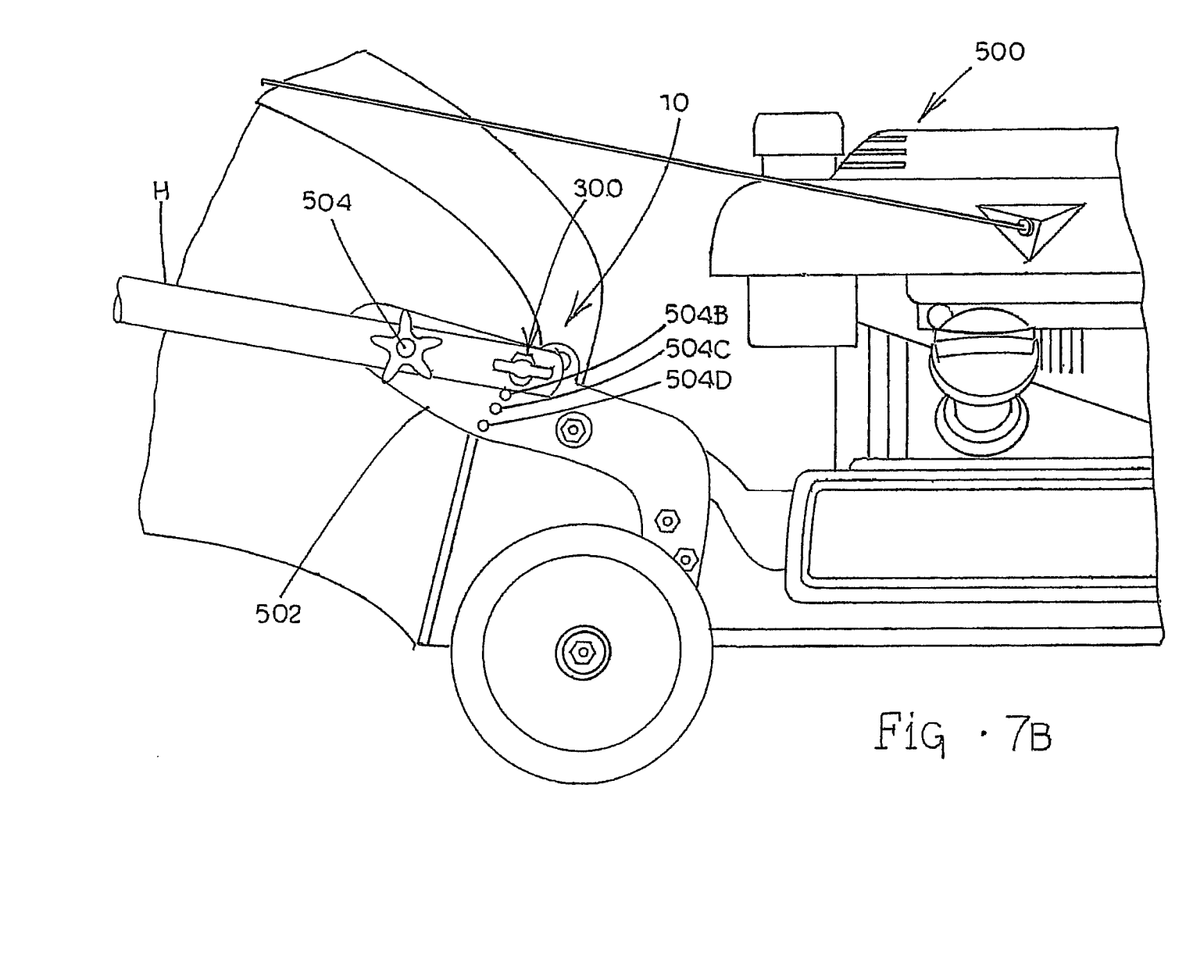

FIGS. 7a and 7b of the drawings illustrate, for example only and without limitation, use of pin apparatus 10 with association with a walk-behind machine shown as a lawnmower 500. A positioning plate 502 can be attached to or formed as part of lawnmower 500, and machine handle H can be attached to positioning plate 502 at a pivot 504. Positioning plate 502 can define a plurality of positioning holes, such as for example positioning holes 504A, 504B and 504C shown in FIG. 7a and also positioning hole 504D shown in FIG. 7b. Positioning holes 504A-D are adapted for receiving at least a portion of pin body 100 (shown previously). Pin apparatus 10 can be used to selectively and securely position machine handle H in a desired alignment with respect to positioning plate 502. Proper alignment and adjustment of machine handle H is important since an upper end or attachment to machine handle H is typically engaged to push lawnmower 500. The pivotal attachment of machine handle H to positioning plate 502 permits pivotal movement of machine handle H such that machine handle H can be positioned adjacent either of positioning holes 504A-D. Handle 300 of pin apparatus 10 is shown in FIG. 7a in its position as illustrated also in FIGS. 5a and 6a where pin body 100 (shown previously) is in its retracted position thereby allowing movement of machine handle H to selectively position machine handle H adjacent to a desired one of positioning holes 504A-D. Once machine handle H is positioned adjacent a desired one of positioning hole 504A-D, handle 300 can be twisted from the position shown in FIG. 7a to the position shown in FIG. 7b to secure and lock in place machine handle H in a desired alignment with respect to positioning plate 502. When pin apparatus 10 is in the position as shown in FIG. 7b, at least a portion of pin body 100 (shown previously) extends into the adjacent positioning hole of positioning plate 502 to secure and prevent pivotal movement of machine handle H. As shown for exemplary purposes only in FIG. 7b, handle 300 of pin apparatus 10 is positioned to secure and lock machine handle H into a position or alignment where pin body 100 (shown previously) extends into positioning hole 504a of position of plate 502.

It can therefore be readily understood that pin apparatus 10 can be used in association with lawnmower 500 to secure machine handle H in a desired position and alignment with respect to positioning plate 502 of lawnmower 500. Once pin apparatus 10 has been utilized to secure machine handle H in a desired position with respect to positioning plate 502 it can be readily be understood that subsequent alignment adjustments of machine handle H can be easily accomplished by simply again twisting handle 300 of pin apparatus 10 to move handle 300 from the position shown in FIG. 7b back to the position shown in FIG. 7a allowing pivotal movement of machine handle H with respect to positioning plate 502.

It will be understood that various details of the presently disclosed subject matter may be changed without departing from the scope of the present subject matter. Furthermore, the foregoing description is for the purpose of illustration only, and not for the purpose of limitation.

What is claimed is:

1. A pin apparatus comprising:
   (a) a housing defining an opening along a longitudinal axis for receiving at least a portion of a pin;
   (b) a pin comprising an elongated pin body, the pin body having a proximal end section and a distal end section, the pin body positioned at least partially through the opening of the housing where the pin is movable with respect to the housing from an extended position to a retracted position; and
   (c) a pin handle disposed on the proximal end section of the pin body and external from the housing for moving the pin within the housing;
   (d) wherein at least a portion of the pin body is adapted for positioning at least partially through a machine handle of a walk-behind machine and at least a portion of the housing is adapted for positioning outside of the machine handle whereby the pin moves between the extended position and the retracted position upon rotation of the pin handle.

2. The apparatus of claim 1, wherein the pin handle comprises a grip portion and a cover portion, wherein the cover portion is movable from a first position forming a gap with a surface below the cover portion to a second position flush with the surface below the cover portion.

3. The apparatus of claim 1, wherein the pin is biased towards the extended position.

4. The apparatus of claim 3, wherein a biasing member is disposed at least around the elongated pin body to bias the pin towards the extended position.

5. The apparatus of claim 1, wherein the machine handle comprises a handle of a lawnmower.

6. The apparatus of claim 1, wherein the pin body is slidable along the longitudinal axis of the housing.

7. The apparatus of claim 1, wherein the housing comprises an inner wall formed between a top opening with a first diameter in a top end of the housing and a bottom opening with a second diameter in a bottom end of the housing, and wherein the first diameter is different from the second diameter.

8. A pin apparatus for securing a machine handle of a walk-behind machine, the apparatus comprising:
   (a) a pin comprising an elongated pin body, the pin body having a proximal end section and a distal end section with the distal end section forming a shelf therebetween;
   (b) a housing, a portion of which is provided outside of a machine handle for receiving at least a portion of the pin body thereby guiding the pin body through the machine handle;
   (c) a biasing member at least partially disposed around the pin body such that the biasing member contacts the shelf and at least a portion the housing;
   (d) the machine handle comprising an opening for receiving at least a portion of the pin as guided by the housing; and
   (e) a pin handle disposed on the proximal end section of the pin body and external from the housing whereby rotation of the pin handle moves the pin body between an extended position and a retracted position with respect to the housing and the machine handle.

9. The apparatus of claim 8, wherein the walk-behind machine comprises a lawnmower.

10. The apparatus of claim 8, wherein the pin body is slidable within the housing.

11. The apparatus of claim 10, wherein the pin body is slidable along a longitudinal axis of the housing, the housing further comprising a housing body having an inner wall formed between a top opening with a first diameter in a top end of the housing and a bottom opening with a second diameter in a bottom end of the housing, wherein the first diameter is different from the second diameter.

12. The apparatus of claim 8, wherein at least a portion of the housing is positioned inside of the machine handle of the walk-behind machine.

13. The apparatus of claim 8, wherein the pin handle comprises an elongated grip portion for moving the pin between the extended and retracted positions, when in the extended position the grip portion is positioned in a first direction that is at least generally parallel to a direction of extension of the machine handle, and when in the retracted position the grip portion is positioned in a second direction that is at least generally perpendicular to a direction of extension of the machine handle.

14. The apparatus of claim 8, wherein the pin handle comprises a grip portion and a cover portion, wherein the cover portion is movable from a first position forming a gap with a surface below the cover portion to a second position flush with the surface below the cover portion.

15. The apparatus of claim 8, wherein the pin is biased towards the extended position via the biasing member.

16. A pin apparatus comprising:
(a) a pin comprising a pin body;
(b) a housing comprising a top end and a bottom end, the top end comprising an opening adapted to receive at least a portion of a pin body, and the bottom end adapted for positioning outside of a machine handle of a walk-behind machine; and
(c) a pin handle disposed on the proximal end section of the pin body and comprising a grip portion and a cover portion;
(d) wherein the pin body moves between an extended position and a retracted position with respect to the housing upon rotation of the pin handle.

17. The apparatus of claim 16, wherein the pin body is biased towards the extended position.

18. The apparatus of claim 16, wherein the pin body comprises a proximal end section and a distal end section with a shelf disposed therebetween.

19. The apparatus of claim 18, wherein a biasing member is disposed around the pin body and can be extended and compressed between the shelf and the top end of the housing.

20. The apparatus of claim 16, wherein the walk-behind machine comprises a lawnmower.

* * * * *